May 12, 1964     D. G. PECKHAM ETAL     3,132,493

ABSORPTION REFRIGERATING SYSTEM

Filed Oct. 10, 1961     2 Sheets-Sheet 1

INVENTORS
DAVID G. PECKHAM
ARTHUR O. ANDERSEN
BY

*Holmes & Andersen*

ATTORNEYS

May 12, 1964 D. G. PECKHAM ETAL 3,132,493
ABSORPTION REFRIGERATING SYSTEM
Filed Oct. 10, 1961 2 Sheets-Sheet 2

INVENTORS
DAVID G. PECKHAM
ARTHUR O. ANDERSEN
BY
*Holmes & Andersen*
ATTORNEYS 3,132,493
ABSORPTION REFRIGERATING SYSTEM
David G. Peckham and Arthur O. Andersen, both of La Crosse, Wis., assignors to The Trane Company, La Crosse, Wis., a corporation of Wisconsin
Filed Oct. 10, 1961, Ser. No. 144,244
7 Claims. (Cl. 62—483)

This invention relates to absorption refrigerating systems and more particularly to absorption refrigerating systems which have pumping means for circulating fluids in the system.

It has been common practice for such absorption refrigerating machines to have a separate pump and a separate driver for each fluid to be pumped. With separate pumps and separate drivers, there are many elements which can fail and prevent the system from operating. Furthermore, the cost of manufacture and the cost of operation are high when separate pumps are used to pump each of the various fluids.

It is an object of this invention to reduce the number of pumps and/or pump drivers required in absorption refrigerating systems which use pumps to circulate the fluids.

It is another object of this invention to provide a centrifugal pump having a partitioned impeller and a cooperating partitioned discharge chamber for pumping two liquids without substantial mixing of the liquids pumped.

It is another object of the invention to provide a centrifugal pump having a partitioned impeller and a partitioned discharge chamber in which the inlets to both passageways of the impeller are on the same side of the impeller.

It is another object of the invention to provide in an absorption refrigerating system, a motor having a double extended shaft for driving a first pump at one end for pumping a first fluid and for driving a second pump at the other end, said second pump being of the centrifugal type and having a partitioned impeller and a cooperating partitioned discharge chamber for pumping two fluids of the system.

It is still another object of the invention to provide an absorption system having a centrifugal pump having two separate passageways for pumping a dilute solution of absorbent in one passageway and a concentrated solution or a mixture of concentrated and dilute solution in the other passageway of the pump.

Other objects and advantages of this invention will become apparent as the specification proceeds to describe the invention with reference to the accompanying drawings in which.

This invention relates to systems of the type described in Patent No. 2,986,906 granted June 6, 1961, to E. M. Stubblefield et al. Reference is made to such patent for a more complete description of the system.

Figure 1:
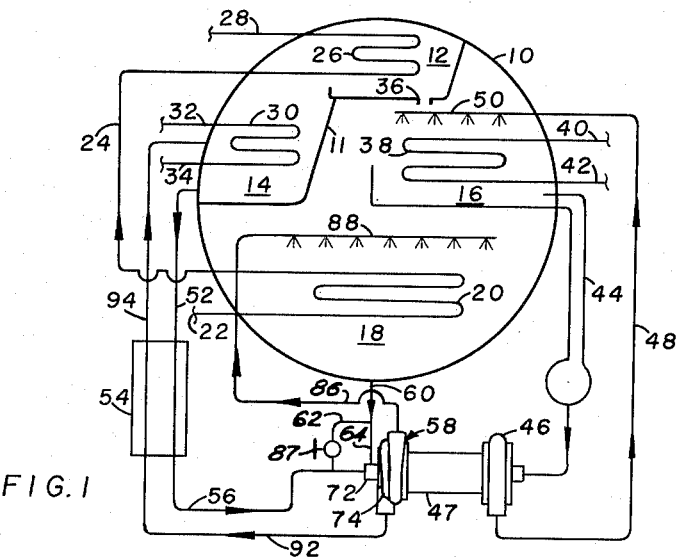
FIGURE 1 is a diagrammatic view of an absorption system according to this invention.

Referring now to FIGURE 1, the absorption system shown is of the type having a single shell 10 with a partition 11 separating a high pressure chamber containing a condenser 12, and a generator 14 from a low pressure chamber containing an evaporator 16 and an absorber 18. It should be understood that other arrangements might be used; for instance, the generator and the condenser might be in one shell and the absorber and evaporator might be in a second shell with conduits therebetween for conducting fluids.

Various combinations of refrigerant and absorbent may be used. A solution of lithium bromide and water has been found to be highly satisfactory for use.

The absorber 18 has a coil 20 supplied with cooling fluid from a source 22 to remove heat from the absorber. This cooling fluid is conducted by a conduit 24 to a cooling coil 26 in the condenser 12 and the cooling fluid leaves the machine through a conduit 28. The cooling coil 26 in the condenser 12 removes heat from and condenses the refrigerant vapor in the condenser.

The generator 14 has a heating coil 30 supplied with heating fluid from a source 32. The heating fluid is discharged from the coil 30 through a conduit 34. The coil 30 heats the absorbent solution in the generator causing it to boil and force refrigerant vapor into the condenser 12. The condensed refrigerant in the condenser 12 flows through an opening 36 into the evaporator 16. The absorbent solution in the absorber 18 reduces the pressure in the absorber 18 and in the evaporator 16 by the absorption of refrigerant vapor, thus causing the refrigerant in the evaporator 16 to boil. A low temperature is thus maintained in the evaporator 16.

Evaporator 16 has a coil 38. Fluid from a refrigerating load such as an air conditioning system enters the coil 38 through a conduit 40. This fluid is reduced in temperature in the coil 38 and returns to the refrigerating load through conduit 42. The liquid refrigerant in the evaporator 16 flows through a conduit 44 to a pump 46 which is driven by a motor 47. Pump 46 has a discharge conduit 48 for conducting the fluid discharged by the pump to a spray tree 50 in the evaporator 16.

Concentrated absorbent solution flows from generator 14 through a conduit 52 to heat exchanger 54 and thence through a conduit 56 to pump 58.

Dilute solution flows from absorber 18 through conduit 60 and thence through branch conduits 62 and 64. Conduit 62 is in fluid communication with conduit 56 to add dilute solution to the concentrated solution flowing in conduit 56.

Figure 2:
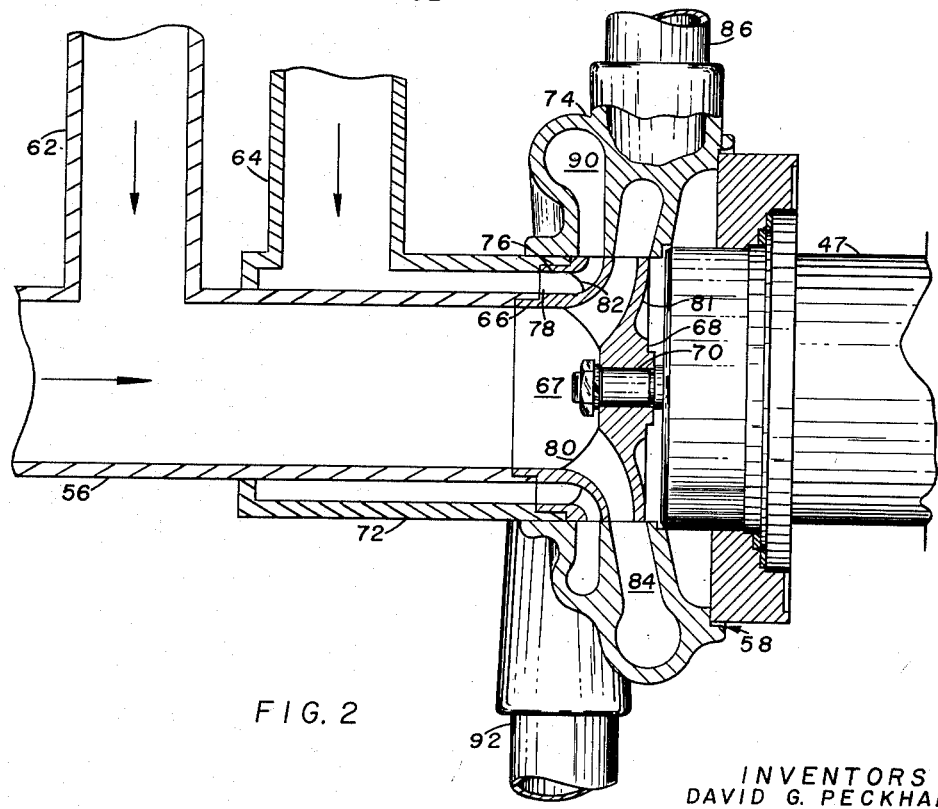
FIGURE 2 is an enlarged view of the pump of the absorption system of FIGURE 1 showing the conduit for conducting liquid to and from the pump.

Referring now to FIGURE 2 the conduit 56 is in relative rotative sealed engagement with the partition 66 and in fluid communication with the passageway 67 of pump impeller 68. The pump impeller 68 is of the centrifugal type and is mounted on and driven by shaft 70 of motor 47.

Conduit 64 is in fluid communication with a conduit 72 which surrounds the end of conduit 56. Conduit 72 is secured in sealed engagement with pump housing 74 and in relative rotative sealed engagement with the outer wall 76 and in fluid communication with the outer passageway 78 of pump impeller 68. Pump impeller 68 has blades 80 in the inner passageway 67 and blades 82 in the outer passageway 78. The impeller 68 has a back plate 81. The outer wall 76, the partition 66, and back plate 81 of the impeller 68 are in rotative sealing engagement with the walls of the housing 74.

Pump housing 74 has a first discharge chamber 84 in fluid communication with passageway 67. Discharge chamber 84 is in fluid communication with conduit 86 which conducts the discharged mixed solution to spray tree 88 in the absorber 18.

A valve 87 in conduit 62 may be closed when it is desired to pump concentrated solution, without dilution, in the inner passageway 67 of pump 58.

Pump housing 74 has a second discharge chamber 90 in fluid communication with passageway 78. Discharge chamber 90 conducts the discharged dilute solution to conduit 92 through which it flows to heat exchanger 54 and thence through conduit 94 to the generator 14.

Figure 3:
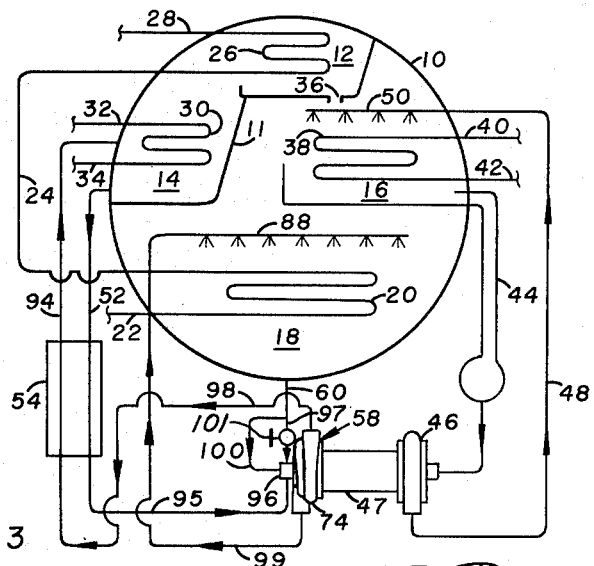
FIGURE 3 is a diagrammatic view of a modification of the absorption system of FIGURE 1.
Figure 4:
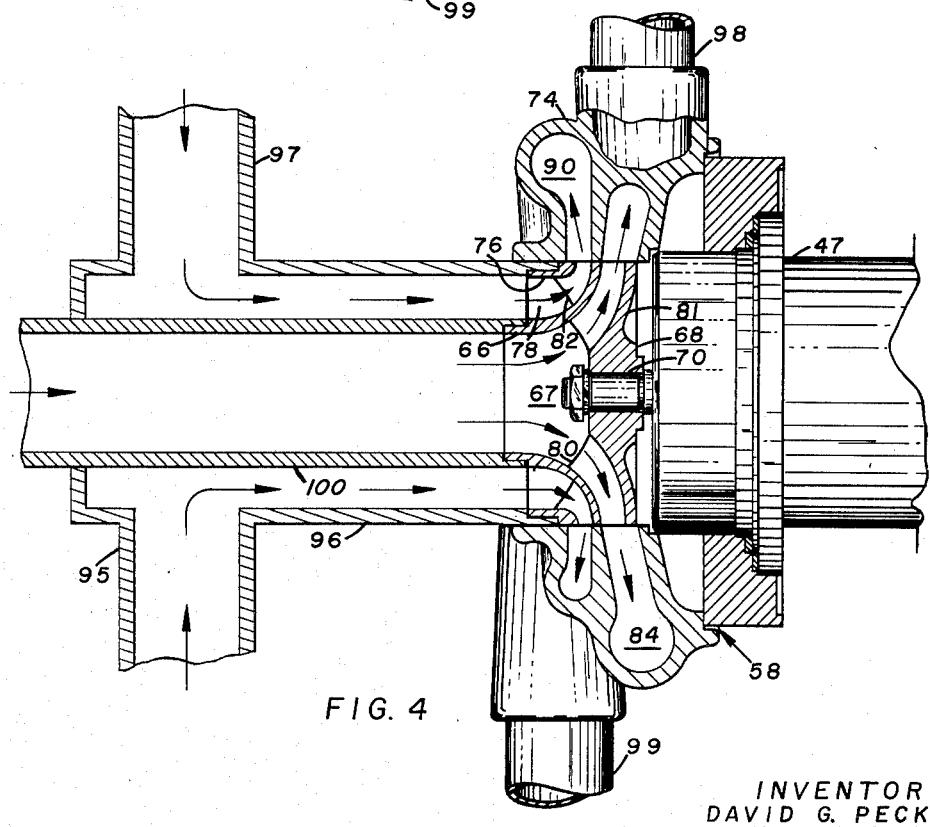
FIGURE 4 is an enlarged view of the pump of the absorption system of FIGURE 3 showing the conduit for conducting liquid to and from the pump.

FIGURES 3 and 4 show a modification of the invention. In this modification the dilute solution enters the inner passageway of the impeller and the mixed solution enters the outer passageway. The solution conduits to and from the pump are modified and they will be described in detail. In other respects the system is similar to that shown in FIGURES 1 and 2.

Referring now to FIGURES 3 and 4, the concentrated solution flows from heat exchanger 54 through conduit 95 to conduit 96. Dilute solution flows from conduit 60 through conduit 97 to conduit 96. Dilute solution flows from conduit 69 through conduit 100 which is in relative rotative sealing engagement with partition 66 and in fluid communication with the passageway 67 of the pump impeller 68. The conduit 96 containing mixed solution is secured in sealed engagement with pump housing 74 and in relative rotative sealed engagement with the outer wall 76 of impeller 68 and in fluid communication with the outer passageway 78 of pump impeller 68.

A valve 101 in conduit 97 may be closed when it is desired to pump concentrated solution, without dilution, in the outer passageway 78 of the pump 58.

The dilute solution is conducted from discharge chamber 84 through conduit 98 to heat exchanger 54. The mixed solution is conducted from discharge chamber 90 through conduit 99 to spray tree 88 in the absorber.

While we have described preferred embodiments of our invention, we contemplate that many changes may be made without departing from the scope or spirit of our invention, and we desire to be limited only by the claims.

We claim:

1. In an absorption refrigerating system, the combination of an absorber, an evaporator, a generator and a condenser, a motor, a pump secured to said motor to be driven thereby, said pump having a first passageway, conduit conducting dilute solution of absorbent from the absorber to the first passageway of said pump, conduit conducting dilute solution of absorbent from the first passageway of said pump to said generator, said pump having a second passageway, conduit for conducting a solution of absorbent from said generator to the second passageway of said pump, and conduit for conducting said last mentioned solution of absorbent from the second passageway of said pump to said absorber.

2. In an absorption refrigerating system, the combination of an absorber, an evaporator, a generator and a condenser, a motor, a pump secured to said motor to be driven thereby, said pump having a first passageway, conduit conducting dilute solution of absorbent from the absorber to the first passageway of said pump, conduit conducting dilute solution of absorbent from the first passageway of said pump to said generator, said pump having a second passageway, conduit for conducting concentrated solution of absorbent from said generator to the second passageway of said pump, and conduit for conducting concentrated solution of absorbent from the second passageway of said pump to said absorber.

3. In an absorption refrigerating system, the combination of an absorber, an evaporator, a generator and a condenser, a motor, a pump secured to said motor to be driven thereby, said pump having a first passageway, conduit conducting dilute solution of absorbent from the absorber to the first passageway of said pump, conduit conducting dilute solution of absorbent from the first passageway of said pump to said generator, said pump having a second passageway, conduit for conducting dilute solution of absorbent from said absorber and concentrated solution of absorbent from said generator to the second passageway of said pump, and conduit conducting a mixture of dilute and concentrated solutions of absorbent from the second passageway of said pump to said absorber.

4. In an absorption refrigerating system, the combination of an absorber, an evaporator, a generator and a condenser, a motor, a first pump secured to one end of said motor to be driven thereby, conduit for conducting refrigerant from said evaporator to the intake of said first pump, conduit for conducting refrigerant from the discharge of said first pump to said evaporator, a second pump secured to the other end of said motor to be driven thereby, said second pump having a first passageway, conduit for conducting dilute solution of absorbent from the absorber to the first passageway of said second pump, conduit for conducting dilute solution of absorbent from the first passageway of said second pump to the generator, said second pump having a second passageway, conduit for conducting concentrated solution of absorbent from the generator to the second passageway of said second pump, and conduit for conducting concentrated solution of absorbent from the second passageway of said second pump to said absorber.

5. In an absorption refrigerating system, the combination of an absorber, an evaporator, a generator and a condenser, a motor, a first pump secured to one end of said motor to be driven thereby, conduit for conducting refrigerant from said evaporator to the intake of said first pump, conduit for conducting refrigerant from the discharge of said first pump to said evaporator, a second pump secured to the other end of said motor to be driven thereby, said second pump having a first passageway, conduit for conducting dilute solution of absorbent from the absorber to the first passageway of said second pump, conduit for conducting dilute solution of absorbent from the first passageway of said second pump to the generator, said second pump having a second passageway, conduit for conducting dilute solution of absorbent from the absorber and concentrated solution of absorbent from the generator to the second passageway of said second pump, and conduit for conducting a mixture of dilute and concentrated solutions of absorbent from the second passageway of said second pump to said absorber.

6. In an absorption refrigerating system, the combination of an absorber, an evaporator, a generator and a condenser, a motor, a pump secured to said motor to be driven thereby, a first conduit in liquid flow communication with a first passageway in said pump, a second conduit conducting dilute solution of absorbent from the absorber to said first conduit, a third conduit conducting a concentrated solution of absorbent from said generator to said first conduit, a fourth conduit conducting a mixture of dilute and concentrated solutions of absorbent from the first passageway of said pump to said absorber, a fifth conduit surrounding said first conduit and conducting dilute solution from said absorber to a second passageway of said pump, and a sixth conduit conducting dilute solution from said second passageway of said pump to said generator.

7. In an absorption refrigerating system, the combination of an absorber, an evaporator, a generator and a condenser, a motor, a pump secured to said motor to be driven thereby, said pump having a first passageway, a first conduit conducting dilute solution of absorbent from the absorber to the first passageway of said pump, a second conduit conducting dilute solution of absorbent from the first passageway of said pump to said generator, said pump having a second passageway, a third conduit surrounding said first conduit and in liquid flow communication with the second passageway of said pump, a fourth conduit conducting a dilute solution of absorbent from said absorber to said third conduit, a fifth conduit conducting concentrated solution of absorbent from said generator to said third conduit and a sixth conduit conducting a mixture of dilute and concentrated solutions of absorbent from the second passageway of said pump to said absorber.

References Cited in the file of this patent

UNITED STATES PATENTS

| | | |
|---|---|---|
| 2,280,272 | Sullivan | Apr. 21, 1942 |
| 2,518,180 | Reid | Aug. 8, 1950 |
| 2,678,547 | Ashley | May 18, 1954 |
| 2,929,222 | Lang | Mar. 22, 1960 |
| 2,990,779 | Reinecke | July 4, 1961 |

FOREIGN PATENTS

| | | |
|---|---|---|
| 317,933 | Germany | Jan. 7, 1920 |